United States Patent
Lorenz

(10) Patent No.: US 10,851,847 B2
(45) Date of Patent: Dec. 1, 2020

(54) CLUTCH DEVICE FOR A HYBRID DRIVE

(71) Applicant: SCHAEFFLER TECHNOLOGIES AG & CO. KG, Herzogenaurach (DE)

(72) Inventor: Elmar Lorenz, Rheinmuenster Soellingen (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 76 days.

(21) Appl. No.: 15/750,014

(22) PCT Filed: Aug. 10, 2016

(86) PCT No.: PCT/DE2016/200366
§ 371 (c)(1),
(2) Date: Feb. 2, 2018

(87) PCT Pub. No.: WO2017/028856
PCT Pub. Date: Feb. 23, 2017

(65) Prior Publication Data
US 2018/0231066 A1 Aug. 16, 2018

(30) Foreign Application Priority Data
Aug. 20, 2015 (DE) .......................... 10 2015 215 875

(51) Int. Cl.
*F16D 21/06* (2006.01)
*F16D 25/0638* (2006.01)
(Continued)

(52) U.S. Cl.
CPC .............. *F16D 21/06* (2013.01); *B60K 6/387* (2013.01); *F16D 25/0638* (2013.01);
(Continued)

(58) Field of Classification Search
None
See application file for complete search history.

(56) References Cited

U.S. PATENT DOCUMENTS

| 7,322,896 B2 | 1/2008 | Minagawa |
| 7,811,191 B2 | 10/2010 | Iwase et al. |

(Continued)

FOREIGN PATENT DOCUMENTS

| CN | 1618644 A | 5/2005 |
| CN | 101337500 A | 1/2009 |

(Continued)

OTHER PUBLICATIONS

International Search Report for Application No. PCT/DE2016/200366, dated Dec. 8, 2016, 7 pages.

(Continued)

*Primary Examiner* — Timothy Hannon

(57) ABSTRACT

A clutch device, comprising a first input side coupled to a first drive motor, a second input side coupled to a second drive motor, a first and second output side, wherein the first and second output sides can and the first and second input sides can be rotated about a common axis. The clutch device further includes a first clutch located between the first input side and the first output side, a second clutch located between the first input side and the second output side, and a third clutch located between the first input side and the second input side, wherein the third clutch is arranged offset relative to the first clutch.

18 Claims, 4 Drawing Sheets

(51) Int. Cl.
*F16D 25/08* (2006.01)
*F16D 25/10* (2006.01)
*H02K 7/108* (2006.01)
*B60K 6/387* (2007.10)
*H02K 7/00* (2006.01)

(52) U.S. Cl.
CPC ........... *F16D 25/082* (2013.01); *F16D 25/10* (2013.01); *H02K 7/006* (2013.01); *H02K 7/108* (2013.01); *F16D 2021/0661* (2013.01); *F16D 2021/0669* (2013.01); *Y10S 903/914* (2013.01)

(56) References Cited

U.S. PATENT DOCUMENTS

| | | |
|---|---|---|
| 8,453,817 B2 | 6/2013 | Schrage |
| 8,757,305 B2 | 6/2014 | Roske et al. |
| 9,193,255 B2 | 11/2015 | Arnold et al. |
| 2014/0123806 A1* | 5/2014 | Lee .......................... B60K 6/50 74/661 |
| 2017/0267092 A1* | 9/2017 | Thackwell ............. H02K 7/108 |

FOREIGN PATENT DOCUMENTS

| | | | |
|---|---|---|---|
| CN | 102308108 A | 1/2012 | |
| DE | 102007003107 A1 | 8/2007 | |
| DE | 1020070031007 A1 | 8/2007 | |
| DE | 102009059944 A1 | 7/2010 | |
| DE | 102009030135 A1 | 12/2010 | |
| DE | 102009038344 A1 | 2/2011 | |
| DE | 102010003442 A1 | 10/2011 | |
| DE | 102011117781 A1 | 5/2013 | |
| DE | 102014224476 A1 * | 6/2016 | ............... H02K 3/28 |
| EP | 2517915 A1 | 10/2012 | |

OTHER PUBLICATIONS

Office Action for Chinese Application No. 201680044491.7, dated Dec. 25, 2018, 9 pages.

* cited by examiner

CLUTCH DEVICE FOR A HYBRID DRIVE

CROSS-REFERENCE TO RELATED APPLICATIONS

This application is the U.S. National Phase of PCT/DE2016/200366 filed Aug. 10, 2016, which claims priority to DE 102015215875.6 filed Aug. 20, 2015, the entire disclosures of which are incorporated by reference herein.

TECHNICAL FIELD

The disclosure relates to a clutch device. In particular, the disclosure concerns a clutch device for a hybrid drive system.

BACKGROUND

A motor vehicle has a first drive motor which is configured as an electrical machine, and a second drive motor which is configured as an internal combustion engine. The motor vehicle drive may be hybrid, i.e. use any arbitrary combination of the first and/or second drive motors. For this, a clutch device is provided between the drive motors and a transmission of the motor vehicle.

DE 10 2009 059 944 A1 describes a clutch device for a motor vehicle with hybrid drive.

The disclosure is based on the object of indicating additional options for the configuration of a clutch device which may also be used in a hybrid drive system. The disclosure achieves this as disclosed in the embodiments below.

SUMMARY

It has been recognized that an improved clutch device can be provided if the clutch device comprises a first and a second input side as well as a first and a second output side. The first input side can be coupled to a first drive motor and the second input side can be coupled to a second drive motor. The input sides and the output sides can be rotated about a common rotation axis. Furthermore, the clutch device comprises a first clutch, which lies between the first input side and the first output side, a second clutch, which lies between the first input side and the second output side, and a third clutch, which lies between the first input side and the second input side. The third clutch is arranged offset relative to the first clutch and/or to the second clutch.

High flexibility in the design of a clutch device intended for use in a hybrid drive train of a motor vehicle is thereby provided. It is particularly advantageous here if the clutch device is designed as a wet-running clutch device. High variability is furthermore possible through the different ways of assembling the clutch device in terms of the arrangement of the clutches therein.

In another embodiment, the first clutch and the second clutch are arranged in partial radial overlap. The third clutch is furthermore arranged axially adjacent to the first clutch, on a side facing away from the second clutch. As an alternative, the third clutch is arranged axially adjacent to the second clutch, on a side facing away from the first clutch.

In another embodiment, the first clutch and the second clutch are arranged in partial radial overlap. The third clutch is furthermore arranged radially on the inside relative to the first clutch. The first clutch and the third clutch are arranged in at least partial axial overlap. As an alternative, the third clutch is arranged radially on the inside relative to the second clutch, and the second clutch and the third clutch are arranged in at least partial axial overlap.

In another embodiment, the first clutch and the second clutch are arranged in at least partial radial overlap. In this case, the third clutch is arranged radially on the outside relative to the first clutch. The first clutch is arranged in axial overlap with the third clutch. As an alternative, the third clutch is arranged radially on the outside relative to the second clutch. The second clutch and the third clutch are also arranged in axial overlap.

In another embodiment, the first clutch and the second clutch are arranged in at least partial axial overlap, wherein the first clutch is arranged offset radially relative to the second clutch. The third clutch is arranged radially on the outside relative to the first clutch or radially on the outside relative to the second clutch. The third clutch may be arranged offset axially relative to the first clutch and/or to the second clutch. As an alternative, the third clutch is arranged in at least partial axial overlap with the first clutch and/or with the second clutch.

In another embodiment, the first clutch and the second clutch are arranged offset radially relative to one another, wherein the first clutch and the second clutch are arranged in at least partial axial overlap. The third clutch is arranged offset axially relative to the first clutch and the second clutch. The third clutch is arranged in radial overlap with the first clutch and the second clutch.

In another embodiment, the first clutch is arranged radially on the outside or radially on the inside relative to the second clutch.

In another embodiment, the third clutch is arranged offset axially relative to the first clutch and/or to the second clutch.

In another embodiment, the third clutch is arranged offset radially relative to the first clutch and/or to the second clutch.

BRIEF DESCRIPTION OF THE DRAWINGS

The disclosure is explained in more detail below with reference to the figures. The drawing shows.

DETAILED DESCRIPTION

Figure 1:
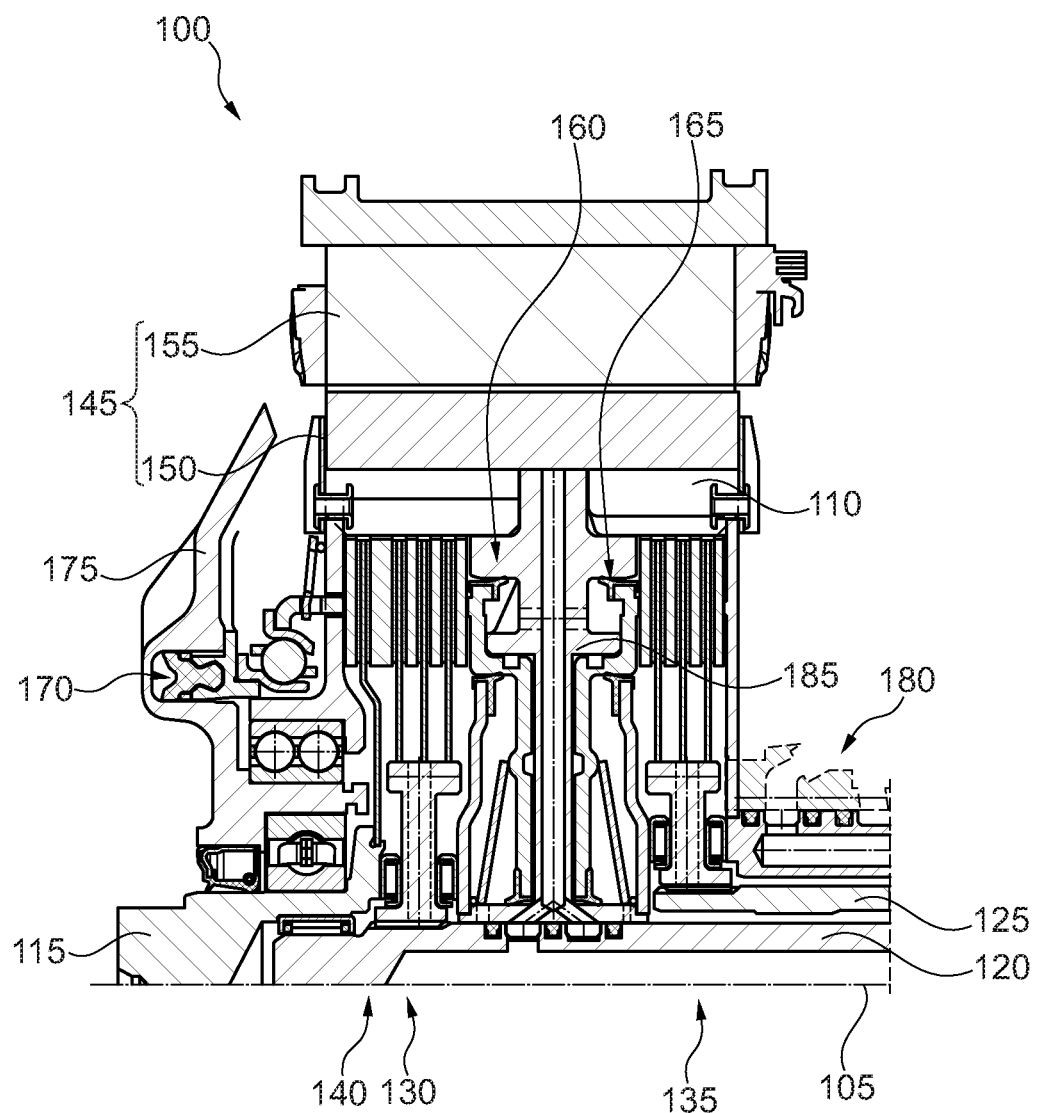
FIG. 1 a half longitudinal section through an illustrative clutch device according to a first embodiment.

FIG. 1 shows a half longitudinal section through an illustrative clutch device 100. A first input side 110, a second input side 115, a first output side 120 and a second output side 125 are arranged around a rotation axis 105.

A first clutch 130 lies between the first input side 110 and the first output side 120, a second clutch 135 lies between the first input side 110 and the second output side 125, and a third clutch 140 lies between the first input side 110 and the second input side 115. The first two clutches 130 and 135 may be offset axially relative to each other and form an axial double clutch. The third clutch 140 may be offset axially relative to one of the two other clutches 130 and 135.

The first input side 110 is configured for connection to an electrical machine 145, which is designed as a first drive motor and comprises a rotor 150 and a stator 155. The electrical machine 145 may be an internal rotor type, wherein the stator 155 lies radially outside the rotor 150. The stator 155 may include at least one magnetic coil, and the rotor 150 comprises at least one permanent magnet. The rotor 150 may lie radially outside the clutches 130, 135 and 140, and in the embodiment shown is connected to the first input side 110 in a fixed manner by means of riveting. The second input side 115 may be configured for connection to a combustion machine, in particular an internal combustion engine, further may be a reciprocating piston engine, which is designed as a second drive motor.

The output sides 120 and 125 are configured for connection to input shafts of a double gearbox (not shown). The double gearbox normally couples each of the input shafts via a separate gearwheel pair to a common output shaft, which in turn acts on a drive wheel of the motor vehicle. In order to select a gear, either the first clutch 130 or the second clutch 135 is closed while the respective other clutch 125, 130 remains open. On each gearbox shaft, the double gearbox may include several gearwheel pairs, only one of which is engaged at a time. A gearwheel pair may usually be engaged or disengaged when it is connected to an output shaft 120, 125, the assigned clutch 130, 135 of which is open at that time.

In particular, the clutch device 100 is configured to be used in a drive train of the motor vehicle. Here, the motor vehicle may preferably be operated in a hybrid mode, i.e. driven alternatively by the internal combustion engine, by the electrical machine 145 or by both drive motors. If the internal combustion engine is used, the third clutch 140 is closed. If the electrical machine 145 is used, it is normally actuated electrically such that torque is transferred. The two drive motors may apply both positive and negative torque to the drive train. The electrical machine 145 may also receive kinetic energy from the drive train and convert this into electrical energy, which for example may be temporarily stored in an energy accumulator. Because of its compact structure, the clutch device 100 is particularly suitable for installation transversely at the front of the motor vehicle.

A first actuator device 160 is assigned to the first clutch 130, a second actuator device 165 to the second clutch 135, and a third actuator device 170 to the third clutch 140. All three actuator devices 160, 165 and 170 may be hydraulic and are each configured to exert an axial force on one of the clutches 130, 135, 140, so that friction elements of the clutches 130, 135 or 140 are pressed axially against each other in order to generate a friction engagement and transmit a torque between the friction elements. The friction elements may be each pressed together between the assigned actuator device 160, 165, 170 and an axial thrust bearing. Furthermore, the hydraulic actuator devices 160, 165, 170 may be actively controlled individually in that, by means of a valve or pump, pressurized medium is deliberately introduced into or discharged from a hydraulic pressure chamber. Alternatively for example, a centrifugal oil-controlled actuation may also be provided.

The three clutches 130, 135 and 140 may be arranged in a common housing 175 which is at least partially filled with a liquid medium 180, in particular an oil. The medium 180 may also be used as a working medium of the hydraulic actuator devices 160, 165 and 170. The clutches 130, 135 and 140 may be a wet-running type and may each be designed as a single plate or multiplate clutch. As a further embodiment, the first clutch 130 and the second clutch 135 are of the multiplate type, in order to allow finely-controlled opening and closing of the torque flow through the clutches 130, 135. The third clutch 140 may also, as shown, be of the single plate type, wherein the third clutch 140 may be configured as a shift clutch which as far as possible is not operated under slip.

In the embodiment shown, a radial flange 185 is arranged axially between the first clutch 130 and the second clutch 135 as a thrust bearing, against which the clutches 130, 135 may be pressed by means of the assigned actuator device 160, 165. Actuating forces of the actuator devices 160, 165, 170 may be supported inside the clutch device 100, so that no resulting forces need be supported externally.

Figure 2:
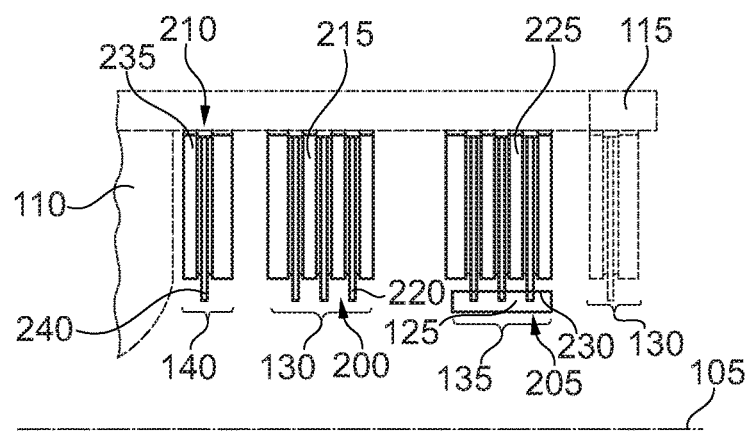
FIG. 2 a diagrammatic illustration of a half longitudinal section through the clutch device shown in FIG. 1.

FIG. 2 shows a diagrammatic illustration of a half longitudinal section through the clutch device 100 shown in FIG. 1.

The first clutch 130 has a first friction packet 200. The second clutch 135 has a second friction packet 205, and the third clutch 140 has a third friction packet 210. The first friction packet 200 comprises a first friction partner 215 and a second friction partner 220. The second friction packet 205 comprises a third friction partner 225 and a fourth friction partner 230. The third friction packet 210 comprises a fifth friction partner 235 and a sixth friction partner 240. In the embodiment, by way of example, the first, third and/or fifth friction partners 215, 225, 235 are designed as unlined friction plates. It is, of course, also possible for the first, third and/or fifth friction partners 215, 225, 235 to be designed as lined plates. In the embodiment, the second, fourth and/or sixth friction partners 220, 230, 240 may be designed as lined plates. The second, fourth and sixth friction partners 220, 230 and 240 can also be designed as unlined friction plates.

The first and second friction partners 215, 220 of the first friction packet 200 are arranged alternately in the form of a stack to form the first friction packet 200. The third and fourth friction partners 225, 230 are arranged alternately adjoining one another in a stack. In the third friction packet 210, the fifth and sixth friction partners 235, 240 are arranged alternately in a stack. Here, the third friction packet 210 has a smaller number of fifth and/or sixth friction partners 235, 240 than the first friction packet 200 and/or the second friction packet 205 has a number of first and second friction partners 215, 220 and/or third and fourth friction partners 225, 230. This is necessitated by the fact that, for example, the electrical machine 145 transmits a lower torque, which has to be transmitted by the third clutch 140 between the first input side 110 and the second input side 115, than is provided by the second drive motor on the second input side 115.

A more detailed explanation of the arrangement of the clutches 130, 135, 140 relative to one another will be given below. In the arrangement of the clutch 130, 135, 140, reference is made in each case here to the position of the respective friction packet 200, 205, 210 of the clutch 130, 135, 140. No further consideration is given here to other components of the clutch 130, 135, 140.

In FIG. 2, the first clutch 130 is arranged offset axially relative to the second clutch 135. In this case, the first clutch 130 and the second clutch 135 are arranged in radial overlap. Here, a radial overlap is understood to exist when the first clutch 130 and/or the second clutch 135 and possibly the third clutch 140 are projected into a plane arranged perpendicularly to the rotation axis 105 and the clutches 130, 135, 140 at least partially overlap in said plane. Thus, the first and the second clutch 130, 135 have a common radial installation space in the case of a complete radial overlap.

In the embodiment, the first clutch 130 may have the same radial extent as the second clutch 135. Of course, it is also possible for the first clutch 130 to be of radially wider or narrower design than the second clutch 135. In this case, it is advantageous if the first clutch 130 is arranged so as to radially overlap the second clutch 135 at least partially and preferably completely.

The third clutch 140 may be arranged axially between the first input side 110 and the first clutch 130, on a side of the first clutch 130 facing away from the second clutch 135. The first clutch 130 is arranged axially adjacent to the second clutch 135. This configuration has the advantage that the radial installation space is particularly small. In this case, the third clutch 140 fully overlaps the first clutch 130 and the second clutch 135. Thus, the third clutch 140 is arranged in the radial installation space of the first and second clutches 130, 135. The third clutch 140 is arranged offset axially relative to the second clutch 135 and to the first clutch 130. The third clutch 140 may be designed to be of the same radial width as the first clutch 130 and the second clutch 135. It is also possible for the third clutch 140 to be of radially thinner or wider design than the first clutch 130 and/or the second clutch 135.

In FIG. 2, a variant of the arrangement of the clutches 130, 135, 140 which is shown in FIGS. 1 and 2 is indicated in dashed lines. In this case, the third clutch 140 is arranged axially adjacent to the second clutch 135, on a side facing away from the first clutch 130. Here, it is likewise possible for the first input side 110 to be arranged on a side of the second clutch 135 facing away from the first clutch 130. The first clutch 130 is arranged axially adjacent to the first input side 110. The first input side 110 can be connected in a torque-transmitting manner to the third clutch 140 by means of elements that are not shown.

Figure 3:
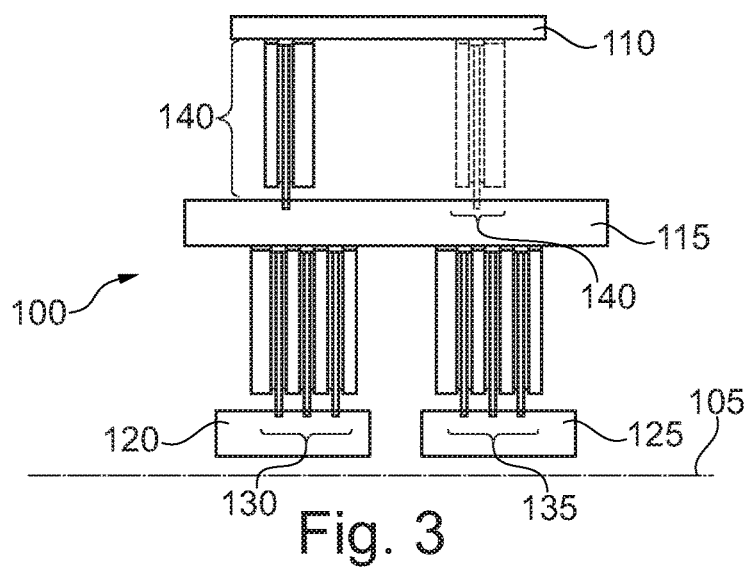
FIG. 3 a diagrammatic illustration of a half longitudinal section through a clutch device according to a second embodiment.

FIG. 3 shows a diagrammatic illustration of a half longitudinal section through a clutch device 100 according to a second embodiment. The clutch device 100 is of similar design to the clutch device 100 shown in FIGS. 1 and 2. As a departure therefrom, the third clutch 140 is arranged radially on the outside relative to the first clutch 130 and the second clutch 135. The second input side 115 may be arranged radially between the third clutch 140 and the first clutch 130 and, in the embodiment, also the second clutch 135. The first input side 110 may be arranged radially on the outside relative to the third clutch 140. As illustrated by solid lines in FIG. 3, the third clutch 140 may be arranged in axial overlap with the first clutch 130. Here, an axial overlap means that at least two of the clutches 130, 135, 140 are projected into a plane in which the rotation axis 105 is arranged and the clutches 130, 135, 140 at least partially overlap in said plane. Thus, the first and the third clutch 130, 140 have a common axial installation space in the case of a complete axial overlap. Here, the first and second clutches 130, 135 are arranged so as to overlap radially.

In a variant (illustrated in dashed lines), the third clutch 140 is arranged radially on the outside relative to the second clutch 135. The third clutch 140 is arranged in axial overlap with the second clutch 135. The decision as to whether the third clutch 140 is arranged radially on the outside in axial overlap with the first clutch 130 or in axial overlap with the second clutch 135 depends on a potential installation space requirement, and therefore the arrangement described in FIG. 3 allows more flexible adaptation of the third clutch 140 to the available installation space limits.

Figure 4:
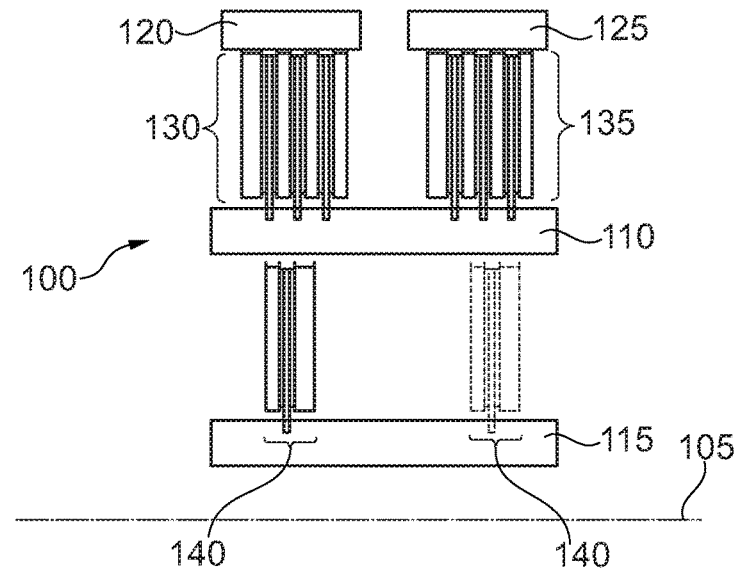
FIG. 4 a diagrammatic illustration of a half longitudinal section through a clutch device according to a third embodiment.

FIG. 4 shows a diagrammatic illustration of a half longitudinal section through a clutch device 100 according to a third embodiment. The clutch device 100 is of similar design to the clutch device 100 shown in FIG. 3. As a departure therefrom, the third clutch 140 is arranged radially on the inside relative to the first clutch 130 and the second clutch 135. The third clutch 140, illustrated by solid lines, may be arranged in axial overlap with the first clutch 130. In the embodiment, the second input side 115 is arranged radially on the inside relative to the third clutch 140. The first in-put side 110 is arranged radially between the third clutch 140 and the first clutch 130 and, in one of the embodiments, preferably also the second clutch 135. The first output side 120 is arranged radially on the outside relative to and in axial overlap with the first clutch 130, and the second output side 125 is arranged in axial overlap with the sec-ond clutch 135 and radially on the outside relative to the second clutch 135.

In a variant of the clutch device 100, which is illustrated in dashed lines in FIG. 4, the third clutch 140 is arranged radially on the inside relative to the second clutch 135. The third clutch 140 is arranged in axial overlap with the second clutch 135.

Figure 5:
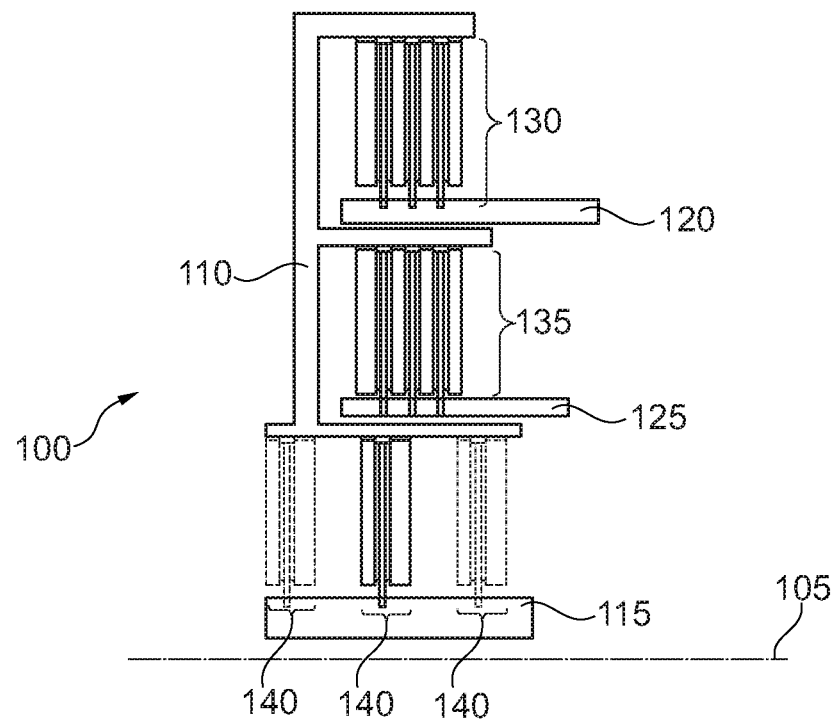
FIG. 5 a diagrammatic illustration of a half longitudinal section through a clutch device according to a fourth embodiment.

FIG. 5 shows a diagrammatic illustration of a half longitudinal section through a clutch device 100 according to a fourth embodiment. The clutch device 100 is of similar design to the clutch device 100 shown in FIGS. 1 to 4.

As a departure therefrom, the clutch device 100 is designed as a radial clutch device. By way of example, the first clutch 130 is coupled radially on the outside to the first input side 110. Radially on the inside of the first clutch 130, the first clutch 130 is coupled to the first output side 120. The second clutch 135 is arranged radially on the inside relative to the first clutch 130 and may be arranged in axial overlap with the first clutch 130. By way of example, the second clutch 135 is coupled radially on the outside to the first input side 110, whereas, radially on the inside, the second clutch 135 is coupled to the second output side 125. The third clutch 140 is arranged radially on the inside relative to the second clutch 135, in axial overlap with the first clutch 130 and the second clutch 135. By way of example, the third clutch 140 is coupled radially on the outside to the first input side 110. Radially on the inside, the third clutch 140 is coupled to the second input side 115. By arranging the clutches 130, 135, 140 in axial overlap, the axial installation space requirement for the clutch device 100 can be minimized.

In this embodiment, the clutches 130, 135, 140 are arranged so as to be fully overlapping axially. An axial overlap here means that if the clutches 130, 135, 140 are projected into a plane in which the rotation axis 105 extends, they overlap in said plane. It is also possible for the clutches 130, 135, 140 to be in only partial axial overlap.

In a variant, which is illustrated in dashed lines in FIG. 5, the third clutch 140 is arranged offset axially relative to the first clutch 130 and/or to the second clutch 135. As before, the third clutch 140 is here arranged radially on the inside relative to the first and second clutches 130, 135. In this case, the third clutch 140 can be arranged offset to the left in the direction of the first input side 110 relative to the first clutch 130 and/or the second clutch 135, for example. As an alternative, it is also possible for the third clutch 140 to be arranged offset to the right relative to the first clutch 130 and/or the second clutch 135.

Figure 6:
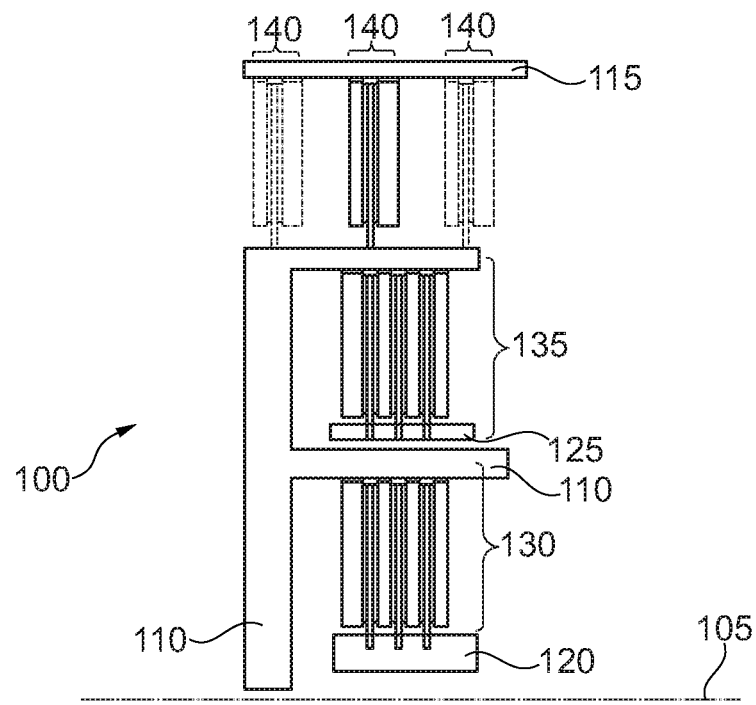
FIG. 6 a diagrammatic illustration of a half longitudinal section through a clutch device according to a fifth embodiment.

FIG. 6 shows a diagrammatic illustration of a half longitudinal section through a clutch device 100 according to a fifth embodiment. The clutch device 100 is of similar design to the clutch device 100 shown in FIG. 5. Here, the first clutch 130 is arranged radially on the inside relative to the second clutch 135. The third clutch 140 is arranged radially on the outside relative to the second clutch 135. Here, the first clutch 130, the second clutch 135 and the third clutch 140 are arranged in axial overlap and may be preferably in full axial overlap. The first output side 120 is arranged radially on the inside relative to the first clutch 130. The second output side 125 is arranged radially on the inside relative to the second clutch 135, radially between the second clutch 135 and the first clutch 130. The first input side 110 is coupled radially on the outside to the first clutch 130 and radially on the outside to the second clutch 135. The first input side 110 is also coupled radially on the inside to the third clutch 140. The third clutch 140 is coupled radially on the outside to the second input side 115.

In a variant, which is illustrated in dashed lines in FIG. 6, the third clutch 140 is arranged offset axially relative to the second clutch 135 and the first clutch 130. By way of example, the third clutch 140 can in this case be arranged offset axially to the left in the direction of the first input side 110.

It is also conceivable for the first clutch 130 to be arranged offset axially relative to the second clutch 135. In this embodiment, the third clutch 140 can be arranged offset axially relative to the first clutch 130 and/or the second clutch 135 or in axial overlap with the second clutch 135 and/or offset axially relative to the first clutch 130. As an alternative, it would also be conceivable for the third clutch 140 to be arranged in axial overlap with the first clutch 130 and offset axially relative to the second clutch 135.

Figure 7:
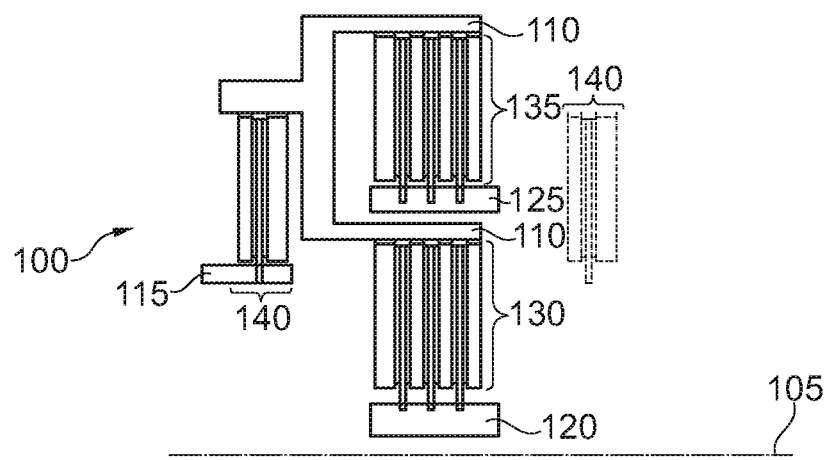
FIG. 7 a diagrammatic illustration of a half longitudinal section through a clutch device according to a sixth embodiment.

FIG. 7 shows a diagrammatic illustration of a half longitudinal section through a clutch device 100 according to a sixth embodiment. The clutch device 100 is of similar design to the clutch device 100 shown in FIGS. 5 and 6. Here, the first clutch 130 is arranged radially on the inside relative to the second clutch 135. Here, the first clutch 130 and the second clutch 135 are arranged in axial overlap and may be preferably in full axial overlap. Here, by way of example, the first clutch 130 is coupled radially on the inside to the first output side 120. By way of example, the second clutch 135 is coupled radially on the inside to the second output side 125. The first clutch 130 is coupled radially on the outside to the first input side 110. The second clutch 135 is likewise coupled radially on the outside to the first input side 110.

The third clutch 140 is arranged offset radially relative to the first clutch 130 and the second clutch 135. The third clutch 140 is furthermore arranged in axial overlap with the first clutch 130 and the second clutch 135. By way of example, the third clutch 140 is here coupled radially on the inside to the second input side 115 and radially on the outside to the first input side 110. Of course, it is also conceivable for the third clutch 140 to be coupled radially on the outside to the second input side 115 and radially on the inside to the first input side 110.

In a variant of the embodiment of the clutch device 100 shown in FIG. 7, the third clutch 140 is arranged on the opposite side in FIG. 7. In this case, the third clutch 140 is likewise arranged in axial overlap with the first clutch 130 and the second clutch 135.

Figure 8:
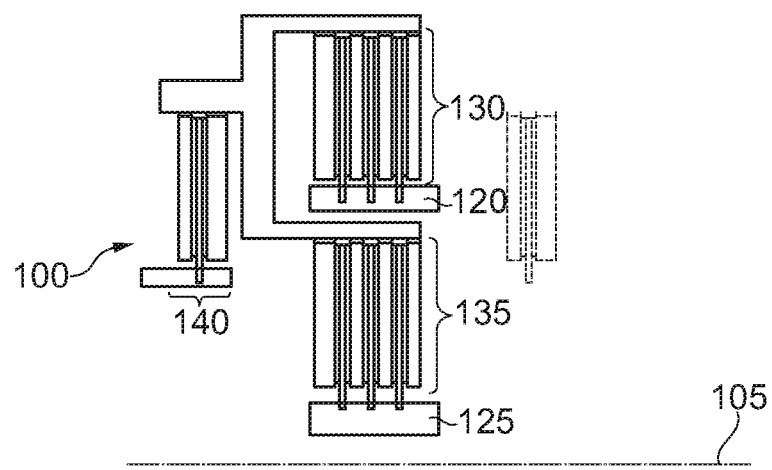
FIG. 8 a diagrammatic illustration of a half longitudinal section through a clutch device according to a seventh embodiment.

FIG. 8 shows a diagrammatic illustration of a half longitudinal section through a clutch device 100 according to a seventh embodiment. The clutch device 100 is of substantially identical design to the clutch device 100 shown in FIG. 7. As a departure therefrom, the second clutch 135 is arranged radially on the inside relative to the first clutch 130. Thus, the second output side 125 is also arranged radially on the inside relative to the first clutch 130 and to the second clutch 135. The third clutch 140 is likewise arranged in axial overlap with the first and second clutches 130, 135.

Attention is drawn to the fact that it is also conceivable, in addition to the embodiments of the clutch device 100 which are shown in FIGS. 1 to 8, for the clutches 130, 135, 140 to be arranged differently.

Attention is also drawn to the fact that the features of the clutch device 100 which are described above in FIGS. 1 to 8 can, of course, also be combined differently with one another. In particular, it is possible for the features described in FIGS. 1 to 8 to be combined with one another.

LIST OF REFERENCE DESIGNATIONS

100 Clutch device
105 Rotation axis
110 First input side
115 Second input side
120 First output side
125 Second output side
130 First clutch
135 Second clutch
140 Third clutch
145 Electrical machine
150 Rotor
155 Stator
160 First actuator device
165 Second actuator device
170 Third actuator device
175 Housing
180 Liquid medium
185 Flange
200 First friction packet
205 Second friction packet
210 Third friction packet
215 First friction partner
220 Second friction partner
225 Third friction partner
230 Fourth friction partner
235 Fifth friction partner
240 Sixth friction partner

The invention claimed is:

1. A clutch device comprising:
a first and a second input side,
a first and a second output side,
wherein the first input side can be coupled to a first drive motor and the second input side can be coupled to a second drive motor, wherein the first drive motor is an electrical machine,
wherein the input sides and the output sides can be rotated about a common rotation axis,
a first clutch located between the first input side and the first output side,
a second clutch located between the first input side and the second output side, wherein the first clutch and second clutch are in radial overlap, and a third clutch located between the first input side and the second input side, wherein the third clutch is connected to both the first clutch and the second clutch via a U-shaped connection configured to transfer power via a split at the U-shape connection before transferring to either the first or second clutch, wherein the third clutch is in partial axially overlap with the first clutch and to the second clutch, wherein each of the first clutch, the second clutch, and the third clutch are completely disposed within a hollow center of the electrical machine.

2. The clutch device of claim 1,
wherein the first clutch and the second clutch are arranged in at least partial radial overlap,
wherein the third clutch is arranged partially axially adjacent to the first clutch.

3. The clutch device of claim 1,
wherein the first clutch and the second clutch are arranged in at least partial radial overlap,
and wherein the first clutch and the third clutch are arranged in at least partial axial overlap.

4. The clutch device of claim 3, wherein the first clutch is arranged radially outside or radially inside relative to the second clutch.

5. The clutch device of claim 1, wherein the third clutch is arranged offset radially relative to the first clutch and the second clutch.

6. The clutch device of claim 1, wherein the second drive motor is designed as a combustion machine.

7. The clutch device of claim 1, wherein the second output side is arranged radially on the inside relative to the first clutch and to the second clutch.

8. The clutch device of claim 1, wherein the second clutch is radially inside relative from the first clutch.

9. The clutch device of claim 1, wherein the first clutch is arranged radially outside relative to the second clutch.

10. The clutch device of claim 1, wherein the first clutch is arranged radially inside relative to the second clutch.

11. A clutch device, comprising:
a first input side coupled to a first drive motor;
a second input side coupled to a second drive motor;
a first and second output side, wherein the first and second output sides and the first and second input sides can be rotated about a common axis;
a first clutch located between the first input side and the first output side;
a second clutch located between the first input side and the second output side, wherein the first clutch and second clutch are in at least partial radial overlap; and
a third clutch arranged offset relative to the first clutch and not in radial overlap with the first clutch and second clutch, wherein the third clutch is connected to both the first clutch and the second clutch, wherein the first clutch, the second clutch, and the third clutch are radially inward relative to the first drive motor and the first clutch, the second clutch, and the third clutch are in complete radial overlap with the first drive motor.

12. The clutch device of claim 11, wherein the third clutch is arranged radially offset relative to the second clutch.

13. The clutch device of claim 11, wherein the first clutch and the second clutch are arranged radially relative to one another.

14. The clutch device of claim 13, wherein the third clutch is arranged offset axially relative to the first clutch and the second clutch.

15. The clutch device of claim 11, wherein the third clutch is coupled radially on the inside to the second input side and radially on the outside to the first input side.

16. The clutch device of claim 11, wherein the second output side is arranged radially on the inside relative to the first clutch and to the second clutch.

17. The clutch device of claim 11, wherein the second clutch is radially inside relative from the first clutch.

18. A clutch device, comprising:
a first input side coupled to an electrical machine;
a second input side coupled to an engine;
a first and second output side, wherein the first and second output sides and the first and second input sides can be rotated about a common axis;
a first clutch located between the first input side and the first output side;
a second clutch located between the first input side and the second output side, wherein the first clutch and second clutch are in at least partial radial overlap; and
a third clutch arranged offset relative to the first clutch and not in radial overlap with the first clutch and second clutch, wherein the third clutch is connected to both the first clutch and the second clutch, wherein the first clutch and the second clutch are radially inward relative to the electrical machine and are in full radial overlap with the electrical machine with respect to the common axis.

* * * * *